United States Patent [19]

Sawamoto et al.

[11] Patent Number: 5,008,354

[45] Date of Patent: Apr. 16, 1991

[54] CONTACT LENS

[75] Inventors: Takeyuki Sawamoto, Tokyo; Masashi Nomura, Kodama; Niro Tarumi, Akishima, all of Japan

[73] Assignee: HOYA Corporation, Tokyo, Japan

[21] Appl. No.: 343,389

[22] Filed: Apr. 26, 1989

[30] Foreign Application Priority Data

Apr. 30, 1988 [JP] Japan ................ 63-108423

[51] Int. Cl.$^5$ .................. C08F 18/20; G02C 7/04
[52] U.S. Cl. .................. 526/246; 351/160 H
[58] Field of Search .................. 526/246; 351/160 H

[56] References Cited

U.S. PATENT DOCUMENTS

| | | | |
|---|---|---|---|
| 3,625,929 | 12/1971 | Stump Jr. et al. | 526/246 |
| 3,660,360 | 5/1972 | Chaudhuri et al. | 526/246 |
| 4,147,851 | 4/1979 | Raynolds | 526/246 |
| 4,433,125 | 2/1984 | Ichinohe et al. | 526/279 |
| 4,550,001 | 10/1985 | Suminoe et al. | 528/499 |
| 4,737,556 | 4/1988 | Itoh et al. | 526/245 |

FOREIGN PATENT DOCUMENTS

| | | | |
|---|---|---|---|
| 0217714 | 12/1984 | Japan | 526/246 |
| 61-266487 | 11/1986 | Japan | 526/246 |
| 63-168416 | 7/1988 | Japan | 526/246 |
| 0273763 | 7/1988 | Japan | 526/246 |

Primary Examiner—Joseph L. Schofer
Assistant Examiner—N. Sarofim
Attorney, Agent, or Firm—Nixon & Vanderhye

[57] ABSTRACT

The contact lens of the present invention consisting of a polymer comprising, as an essential component, at least one fluorine-containing monomer represented by the general formula

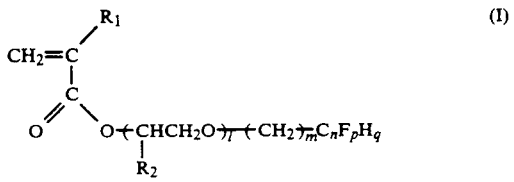

($R_1$ and $R_2$ are independently H or $CH_3$ and may be the same or different, l is an integer of 1–5, m is an integer of 1–2, n is an integer of 4–10, p is an integer of 8 or more, q is an integer of 0 or more, and $p+q=2n+1$), has high transparency, improved oxygen permeability, flexibility, hydrophilicity and no water absorbability.

15 Claims, No Drawings

CONTACT LENS

BACKGROUND OF THE INVENTION (1.) Field of the Invention

The present invention relates to a contact lens and more particularly to a novel contact lens of no water absorbability having excellent oxygen permeability.

(2.) Description of the Prior Art

Contact lenses are largely divided into contact lenses made of hard materials and contact lenses made of soft materials. As the contact lenses made of hard materials, those comprising a polymethyl methacrylate as a main component have conventionally been used widely, but have had a problem of low oxygen permeability and allowing no long continuous wear. Hence, in recent years, there were developed contact lenses with excellent oxygen permeability, such as those comprising a silicone monomer and those comprising a fluorine-containing monomer (e.g. trifluoroethyl methacrylate), as disclosed in, for example, Japanese Patent Application Kokai (Laid-Open) Nos. 194014/1983 and 38418/1987. With these contact lenses, the disturbance of corneal metabolism is low and the long continuous wear is possible.

Meanwhile, as the contact lenses made of soft materials, those of low water absorbability comprising hydroxyethyl methacrylate as a main monomer component have conventionally been used widely, but similarly to the above hard contact lenses, have had low oxygen permeability and have allowed no long continuous wear. Hence, in recent years, there was developed a contact lens of high water absorbability comprising N-vinylpyrrolidone as a main monomer component. Being able to absorb a large amount of lacrima thereinto, the lens has improved oxygen permeability and allows long continuous wear.

As the contact lenses made of soft materials, there are also soft contact lenses of no water absorbability, besides the above-mentioned water-absorbable soft contact lenses. As an example, there can be mentioned a contact lens comprising a silicone rubber, as disclosed in, for example, Japanese Patent Publication No. 61122/1987. Having no water absorbability, this contact lens causes neither spreading of stains into the interior of contact lens nor propagation of bacteria, and accordingly requires no boiling sterilization by water. The lens is further characterized by good oxygen permeability.

As other example of the soft contact lenses of no water absorbability, there is a contact lens comprising a copolymer of an acrylic acid ester and a methacrylic acid ester, as disclosed in, for example, Japanese Patent Application Kokai (Laid-Open) No. 210318/1982. This lens causes no spreading of stains into the interior of lens because of no water absorbability similarly to the above case, but has inferior oxygen permeability and allows no long continuous wear. Therefore, in recent years, there was proposed a contact lens comprising a copolymer of (a) an acrylic acid ester or a methacrylic acid ester and (b) a fluoroalkyl acrylate or a fluoroalkyl methacrylate, as disclosed in, for example, Japanese Patent Application Kokai (Laid-Open) No. 229113/1987. By containing fluorine, this contact lens is designed to have improved oxygen permeability and enable higher oxygen supply to the cornea.

The above-mentioned hard contact lenses, although having significantly improved oxygen permeability, have drawbacks in that being a hard type, they give strong mechanical irritation to the cornea or the sclera when worn, give to the user an uncomfortable feeling of having a foreign object in the eye(s), and cause hyperemia and/or sore. When the extent of hyperemia and/or sore is high, it is impossible in some cases to wear these lenses, which is a big drawback of the hard contact lenses.

Meanwhile in the soft contact lenses, the mechanical irritation to the cornea or the sclera is small and accordingly good feeling is ordinarily obtained when wearing them, but they have the following problems. First, the problems of the water-absorbable soft contact lenses are described. The water-absorbable soft contact lenses take lacrima into the interior of lens; accordingly the lenses are easily stained by lacrima components; the stains easily spread into the interior of lens; and the lenses tend to become insanitary.

Further, the lenses require frequent boiling sterilization by water in order to prevent the propagation of bacteria in the interior of lens, which is a burden to lens users. Furthermore, since the staining of the water-absorbable contact lenses is higher as their water absorbability is higher, the cornea is placed in an insanitary condition over a long period of time and consequently may cause a corneal disoder, particularly when a soft contact lens of high water absorbability is continuously worn over a long period of time. This is a big problem of the water-absorbable soft contact lenses.

Next, the water-non-absorbable soft contact lenses have the following problems.

The contact lens comprising a silicone rubber, although having very superior oxygen permeability, adheres to the cornea, impairs the normal metabolism of the cornea, causes corneal disoder in some cases, thus is questionable as to the safety when worn. Therefore, it is hardly used at present.

The contact lens comprising a copolymer of an acrylic acid ester and a methacrylic acid ester has inferior oxygen permeability as mentioned above and accordingly allows no long continuous wear.

The contact lens comprising a copolymer comprising a fluoroalkyl (meth)acrylate as a monomer component contains said fluoroalkyl (meth)acrylate in order to obtain improved oxygen permeability. In this contact lens, however, the use of fluoroalkyl (meth)acrylate in too large an amount for higher oxygen permeability results in loss of lens flexibility, easy development of plastic deformation when the lens has been deformed, and poor shape recoverability.

The above lens further has water repellency at the surface, which causes a problem in wearing the lens. As a method for improving the water repellency, copolymerization with a hydrophilic monomer is affected generally. However, a copolymer of fluoroalkyl (meth)acrylate and a hydrophilic monomer has a general tendency of being cloudy, and even when being transparent, the copolymer gets cloudy in some cases when immersed in water. Thus, the copolymer has a problem in practical use.

SUMMARY OF THE INVENTION

A broad object of the present invention is to provide a novel contact lens which has solved the above-mentioned problems of the prior art.

That is, an object of the present invention is to provide a novel contact lens which has no water absorbability, which is soft and unlikely to cause plastic deformation and has good shape recoverability, which has excellent oxygen permeability, and which is transparent and does not get cloudy even when it is made of a copolymer with a hydrophilic monomer. Another object of the present invention is to provide a novel contact lens which has excellent wearability and high safety and accordingly which allows long continuous wear.

Other objects of the present invention will be apparent from the following description.

The above objects of the present invention have been achieved by a contact lens consisting of a polymer comprising, as an essential component, at least one fluorine-containing monomer represented by the general formula

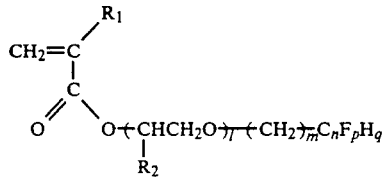
(I)

wherein $R_1$ and $R_2$ are independently H or $CH_3$ and may be the same or different, l is an integer of 1-5, m is an integer of 1-2, n is an integer of 4-10, p is an integer of 8 or more, q is an integer of 0 or more, and $p+q=2n+1$.

The contact lens of the present invention comprising a polymer comprising, as an essential component, at least one fluorine-containing monomer represented by the general formula (I) is characterized by having no water absorbability, being soft and unlikely to cause plastic deformation and having good shape recoverability, having excellent oxygen permeability, and being transparent and giving no cloudiness even when the polymer is a copolymer with a hydrophilic monomer. The present contact lens is further characterized by having excellent wearability and high safety and allowing long continuous wear.

DETAILED DESCRIPTION OF THE INVENTION

The polymer constituting the contact lens of the present invention comprises, as an essential component, at least one fluorine-containing monomer represented by the general formula (I). As the fluorine-containing monomer of the general formula (I), there can be mentioned the followings.

Monomer group (a)

A group of those fluorine-containing monomers of the general formula (I) in which $R_2$ is H and accordingly which have an oxyethylene group and are represented by the general formula

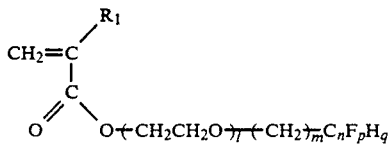
(Ia)

wherein $R_1$, l, m, n, p and q have the same definitions as in the general formula (I).

Monomer group (b)

A group of those fluorine-containing monomers of the general formula (I) in which $R_2$ is $CH_3$ and accordingly which have an oxypropylene group and are represented by the general formula

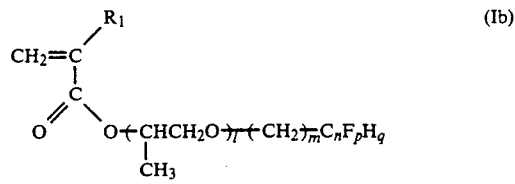
(Ib)

wherein $R_1$, l, m, n, p and q have the same definitions as in the general formula (I).

Monomer group (c)

A group of those fluorine-containing monomers of the general formula (I) in which $R_2$ is both of H and $CH_3$ and accordingly which have an oxyethylene-oxypropylene group and are represented by the general formula

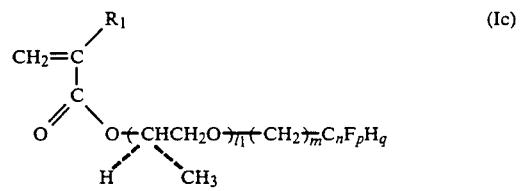
(Ic)

wherein $R_1$, m, n, p and q have the same definitions as in the general formula (I) and $l_1$ is an integer of 2-5.

As the

in the general formula (Ic), there can be mentioned the followings:

(i) an oxyethylene-oxypropylene group consisting of (a) one oxyethylene group or 2-4 oxyethylene groups in block, bonded to the formula

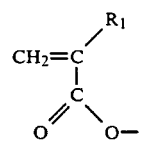

and (b) one oxypropylene group or 2-4 oxypropylene groups in block, bonded to the formula $-(C\ H_2)_m-C_n F_p H_q$, wherein the total number of the group(s) (a) and the group(s) (b) is 2-5, (ii) an oxyethylene-oxypropylene group consisting of (a) one oxypropylene group or 2-4 oxypropylene groups in block, bonded to the formula

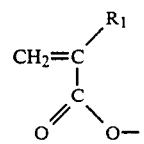

and (b) one oxyethylene group or 2-4 oxyethylene groups in block, bonded to the formula $-(C\ H_2)_m-$ $C_n F_p H_q$, wherein the total number of the group(s) (a) and the group(s) (b) is 2-5, and (iii) an oxyethylene-oxypropylene group existing between the formula

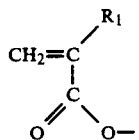

and the formula $—(CH_2)_m— C_n F_p H_q$, and consisting of at least one oxyethylene group and at least one oxypropylene group randomly arranged in their total group number of 3-5.

The fluorine-containing monomer represented by the general formula (I) or its embodiments, i.e. the general formulas (Ia), (Ib) and (Ic) is described in further detail.

The fluorine-containing hydrocarbon group represented by $C_n F_p H_q$ in the above general formulas contributes to increased oxygen permeability of contact lens and imparts flexibility to the lens. n is restricted to an integer of 4-10. The reason is that when n is 3 or less, the resulting polymer is hard and, when n is 11 or more, the polymer is brittle. p is restricted to an integer of 8 or more because the larger number of fluorine atoms gives better oxygen permeability. q is an integer of 0 or more. This implies that $C_n F_p H_q$ can be not only a perfluoroalkyl group (q=0) but also a hydrogen-containing fluoroalkyl group (q=a positive integer). $P+q=2n+1$ is provided to simply indicate that $C_n F_p H_q$ is a fluorine hydrocarbon no unsaturated bond. The $C_n F_p H_q$ is preferably a straight chain.

The oxyethylene group, oxypropylene group or oxyethylene-oxypropylene group represented by

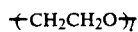

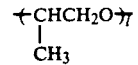

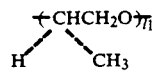

in the general formulas (Ia), (Ib) or (Ic) serves to impart hydrophilicity and good flexibility to the polymer.

The number of oxyethylene group or oxypropylene group, i.e. l is restricted to an integer of 1-5.

The reason is that when l is 0, the polymer is hard, tends to cause plastic deformation and has poor shape recoverability and, when l is 6 or more, no desired oxygen permeability is obtained.

The number of oxyethylene-oxypropylene group, i.e. $l_1$ is restricted to 2-5. The reason is that when $l_1$ is 1, no oxyethylene-oxypropylene group is formed and, when $l_1$ is 6 or more, no desired oxygen permeability is obtained.

The formula $—(CH_2)_m—$ in the above general formulas is needed in order to avoid the hydrolysis of fluorine-containing monomer and to make the monomer a stable compound. In order to obtain a stable monomer, it is sufficient that m is 1 or 2. When m is 3 or more, reduction in oxygen permeability is invited.

As preferable specific examples of the monomers of the groups (a), (b) and (c) represented by the general formulas (Ia), (Ib) and (Ic), there can be mentioned the followings.

Monomer group (a)

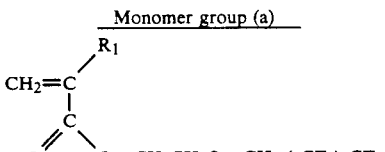

($R_1$: H or $CH_3$)

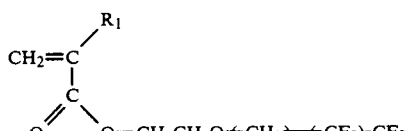

($R_1$: H or $CH_3$)

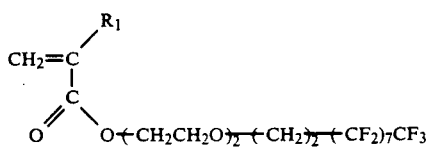

($R_1$: H or $CH_3$)

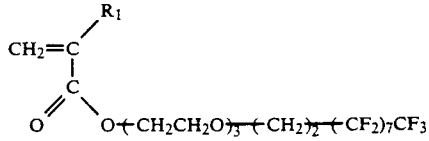

($R_1$: H or $CH_3$)

-continued
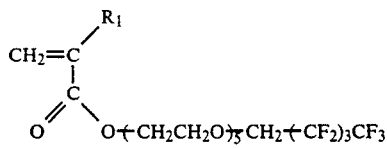
($R_1$: H or $CH_3$)
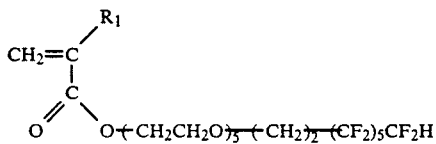
($R_1$: H or $CH_3$)
Monomer group (b)
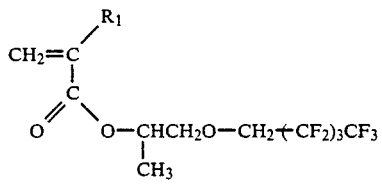
($R_1$: H or $CH_3$)
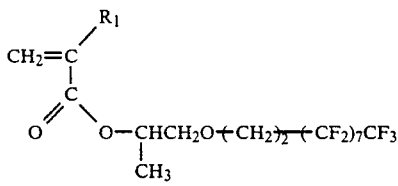
($R_1$: H or $CH_3$)
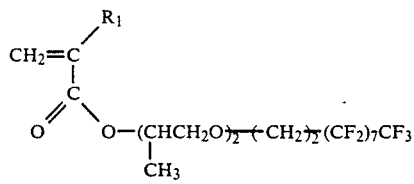
($R_1$: H or $CH_3$)
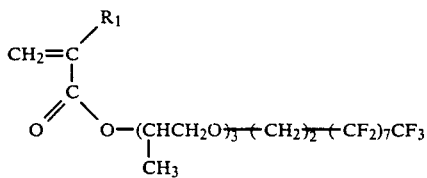
($R_1$: H or $CH_3$)
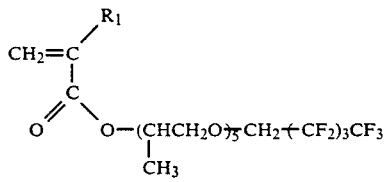
($R_1$: H or $CH_3$)

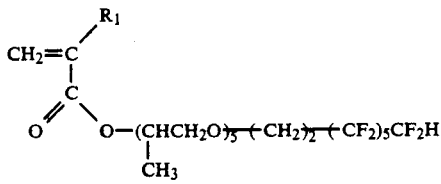
(R$_1$: H or CH$_3$)
Monomer group (c)
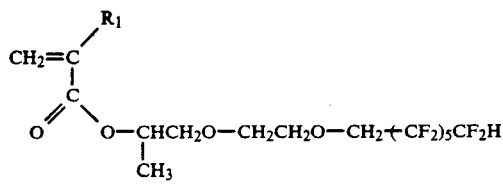
(R$_1$: H or CH$_3$)
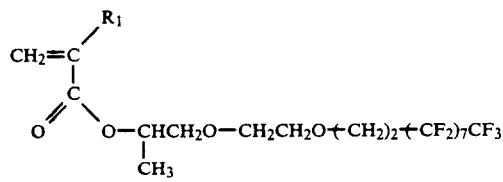
(R$_1$: H or CH$_3$)
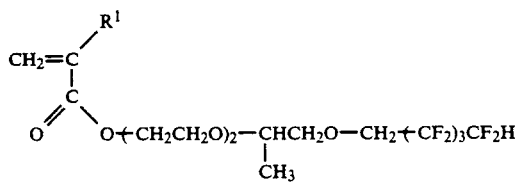
(R$_1$: H or CH$_3$)
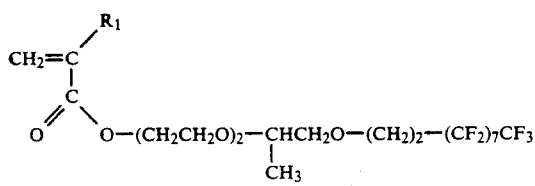
(R$_1$: H or CH$_3$)
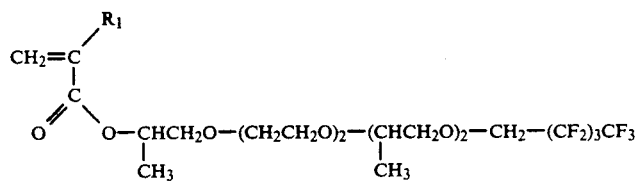
(R$_1$: H or CH$_3$)
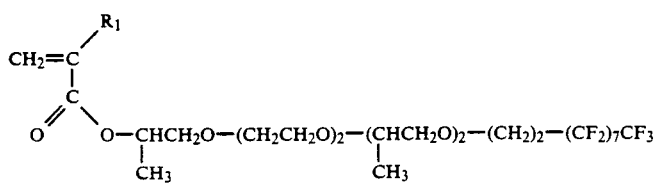
(R$_1$: H or CH$_3$)
The polymer constituting the contact lens of the present invention comprises, as an essential component, at The contact lens of the present invention consisting of a polymer comprising, as an essential component, at least one fluorine-containing monomer has good oxygen permeability, excellent transparency and no water absorbability and is soft. I order to achieve these properties advantageously, it is preferable that the polymer comprises at least one monomer represented by the general formulas (I), (Ia), (Ib) and (Ic) in a proportion of 40% by weight or more.

In the polymer constituting the contact lens of the present invention, modification of the polymer by a conventional method may be affected in order to further enhance the properties of the polymer. For example, a crosslinking monomer may be added to the essential monomer in order to obtain better results for the polymer's dynamic properties, prevention of plastic deformation, and elastic recovery. The addition amount is preferably 0.01%–10% by weight ordinarily. When the amount is more than 10% by weight, the resulting copolymer is hard and brittle and has inferior dynamic properties. As the type of the crosslinking monomer, there is used a monomer having at least two ethylenically unsaturated double bonds in the molecule. As specific examples of such a crosslinking monomer, there can be mentioned ethylene glycol di(meth)acrylate, diethylene glycol di(meth)acrylate, triethylene glycol di(meth)acrylate, allyl (meth)acrylate, glycerol di(meth)acrylate, trimethylolpropane tri(meth)acrylate, triallyl isocyanurate, 1,4-butanediol di(meth)acrylate and divinylbenzene.

In order to further improve, for example, the mechanical properties of the polymer while maintaining its oxygen permeability, there can be further added to the essential monomer a monomer represented by the general formula

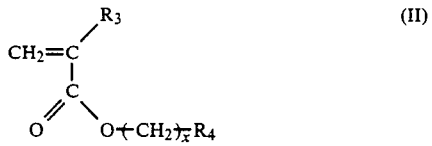

(II)

wherein $R_3$ is H or $CH_3$, $R_4$ is a straight chain fluoroalkyl group of 4–10 carbon atoms and 9–21 fluorine atoms or a straight chain alkyl group of 2–10 carbon atoms, and X is an integer of 1 or 2. The addition amount is preferably 60% by weight or less based on total monomer amount.

In order to further improve, for example, the hydrophilicity of the polymer, it is possible to also add a hydrophilic monomer as a comonomer, such as 2-hydroxyethyl methacrylate, N-vinylpyrrolidone, acrylamide, acrylic acid, methacrylic acid, N,N-dimethylacrylamide, 2-hydroxyethyl acrylate or the like. In this case, the fluorine-containing monomer as an essential component has good compatibility with the above hydrophilic monomer; accordingly, there appears no cloudiness and there is obtained a copolymer of good transparency. The addition amount of the hydrophilic monomer is 30% by weight or less, preferably 20% by weight or less based on total monomer amount.

Next, there is described the polymerization process for obtaining the polymer constituting the contact lens of the present invention. A known polymerization process can be used. In particular, bulk polymerization is preferred. In polymerization, a radical-generating agent is ordinarily used as a polymerization initiator. As the initiator, there can be mentioned azo compounds such as azobisisobutyronitrile, azobisdimethylvaleronitrile and the like, as well as peroxides such as benzoyl peroxide and the like. The addition amount of the initiator is preferably 0.01%–3% by weight based on total monomer amount. The polymerization is completed by increasing the temperature stepwise or continuously. The temperature range is ordinarily 20°–150° C. and the polymerization time is about 3–72 hours. It is preferable that the monomer(s) be polymerized in a contact lens mold to directly obtain a polymer of contact lens shape.

The present invention is described more specifically below by way of Examples and Comparative Examples. However, the present invention is in no way restricted to these Examples. The properties in Examples and Comparative Examples were measured in accordance with the following methods.

Oxygen permeability coefficient

Measured on a sample having a thickness of 0.2 mm in distilled water of 35° C., using a Seikaken type film oxygen permeability meter manufactured by Rika Seiki Kogyo K. K.

Glass transition temperature

Measured in order to evaluate the softness of a polymer. The measurement was affected at a temperature elevation rate of 20° C./min using a high performance differential scanning calorimeter, Model DSC-10A, manufactured by Rigaku Denki K. K.

Light transmittance

Measured in order to evaluate the transparency of a polymer. The measurement was affected on a sample having a thickness of 1 mm in a physiological saline solution, using a recording spectrophotometer, Model 330, manufactured by Hitachi.

EXAMPLE 1

There were mixed 40% by weight of perfluorooctylethyloxypropylene acrylate (OPA1), 57% by weight of perfluorooctylethyloxypropylene methacrylate (OEMA1) and 3% by weight of ethylene glycol dimethacrylate (EDMA). Thereto was added 0.5% by weight, based on total monomer amount, of azobisdimethylvaleronitrile (V-65) as a polymerization initiator. The mixture was casted into a contact lens mold and subjected to polymerization for 3 hours at 40° C., temperature elevation to 90° C. in 4 hours and polymerization for 3 hours at 90° C. to complete polymerization. After cooling, the polymer formed was taken out from the mold to obtain a soft contact lens.

The contact lens had excellent transparency, excellent flexibility, a visible light transmittance of 98% or more and a glass transition temperature of −50° C. It also had a good oxygen permeability coefficient of $60 \times 10^{-11}[cm^3(STP) \, cm/cm^2.sec.mmHg)]$.

EXAMPLES 2–13

Contact lenses each consisting of a different polymer were prepared in the same polymerization procedure as in Example 1 except that a different monomer combination and a different compounding recipe were used in each Example. The lenses were measured for properties in the same manner as in Example 1. The results are shown in Table 1.

Like the contact lens obtained in Example 1, the contact lenses obtained in Examples 2–13 had excellent transparency, excellent flexibility and a high oxygen permeability coefficient. Therefore, they were superior as a soft contact lens.

COMPARATIVE EXAMPLE 1

A soft contact lens was obtained in the same procedure as in Example 4 except that the perfluorooctylethyloxypropylene methacrylate (OPMA1) used in Example 4 was replaced by n-butyl methacrylate (BuMA). That is, there were mixed 35% by weight of n-butyl acrylate (BuA), 62% by weight of n-butyl methacrylate (BuMA) and 3% by weight of ethylene glycol dimethacrylate (EDMA). Then, polymerization was affected in the same procedure as in Example 1 to obtain a soft contact lens. The lens was measured for properties. The results are shown in Table 1. The contact lens of this Comparative Example, as compared with that of Example 4, was about equivalent in glass transition temperature and visible light transmittance but had a lower (inferior) oxygen permeability coefficient of $18 \times 10^{-11}[cm^3(STP)\ cm/cm^2.sec.mmHg)]$.

COMPARATIVE EXAMPLE 2

A soft contact lens was obtained in the same procedure as in Example 9 except that the perfluorooctylethyloxyethylene methacrylate (OEMA1) used in Example 9 was replaced by perfluorohexylethyl methacrylate (13FMA). That is, there were mixed 27% by weight of n-butyl acrylate (BuA), 68% by weight of perfluorohexylethy methacrylate (13FMA) and 5% by weight of ethylene glycol dimethacrylate (EDMA). Then, polymerization was affected in the same procedure as in Example 1 to obtain a soft polymer. The polymer was measured for properties. The results are shown in Table 1. The soft polymer of this Comparative Example, as compared with that of Example 9, was about equivalent in oxygen permeability coefficient and visible light transmittance, but had a higher glass transition temperature and was harder. Further, the soft polymer of this Comparative Example showed poor shape recoverability when deformed and was unsuitable for use as a soft contact lens.

COMPARATIVE EXAMPLE 3

A soft polymer was obtained in the same procedure as in Example 13 except that the perfluorooctylethyloxypropylene methacrylate (OPMA2) used in Example 13 was replaced by perfluorooctylethyl methacrylate (17FMA). That is, there were mixed 27% by weight of perfluorooctylethyl acrylate (17FA), 62% by weight of perfluorooctylethyl methacrylate (17FMA), 10% by weight of N-vinylpyrrolidone (NVP) and 1% by weight of ethylene glycol dimethacrylate (EDMA). Then, polymerization was affected in the same procedure as in Example 1 to obtain a soft polymer. The polymer was measured for properties. The results are shown in Table 1. The soft polymer of this Comparative Example, as compared with that of Example 13, was about equivalent in oxygen permeability coefficient, but had slightly poor flexibility and became cloudy when immersed in water and accordingly had no usability as a contact lens.

Incidentally, the abbreviations used in Examples and Comparative Examples in Table 1 denote the following compounds.

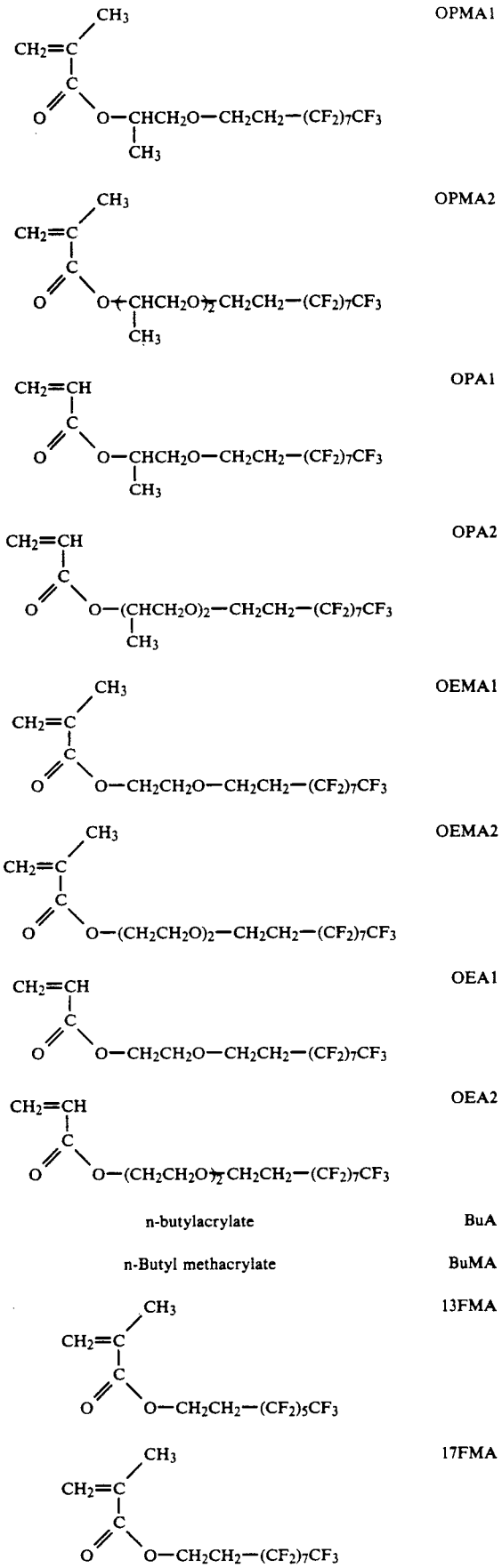

-continued

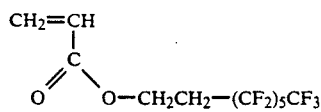
13FA

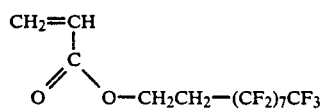
17FA

| N-vinylpyrrolidone | NVP |
| --- | --- |
| Ethylene glycol dimethacrylate | EDMA | mer, and they are an effect unique to the present invention.

What is claimed is:

1. A contact lens having no water absorbability consisting of a polymer comprising, as an essential component, at least one fluorine-containing monomer represented by the general formula

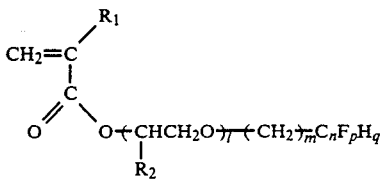
(I)

TABLE 1

Results of Examples and Comparative Examples

| | | Monomers*1 | | | | | | | | | |
| --- | --- | --- | --- | --- | --- | --- | --- | --- | --- | --- | --- |
| | | OPMA1 | OPMA2 | OPA1 | OPA2 | OEMA1 | OEMA2 | OEA1 | OEA2 | BuA | BuMA | 13FMA |
| Examples | 1 | | | 40 | | 57 | | | | | | |
| | 2 | | 70 | | 27 | | | | | | | |
| | 3 | | | | | | 68 | | 27 | | | |
| | 4 | 62 | | | | | | | | 35 | | |
| | 5 | 63 | | | | | | | | | | |
| | 6 | 62 | | | | | | | | | | |
| | 7 | | | 52 | | | | | | | | 42 |
| | 8 | | | 50 | | | | | | | | |
| | 9 | | | | | 68 | | | 27 | | | |
| | 10 | | | | | 60 | | | | | | |
| | 11 | | | | | 65 | | | | | | |
| | 12 | | | | | | | 50 | | | | |
| | 13 | 62 | | | | | | | | | | |
| Comparative | 1 | | | | | | | | | 35 | 62 | |
| Examples | 2 | | | | | | | | | | 27 | 68 |
| | 3 | | | | | | | | | | | |

| | | Monomers*1 | | | | | Oxygen permeability coefficient*2 | Glass transition temperature*3 | Visible light transmittance |
| --- | --- | --- | --- | --- | --- | --- | --- | --- | --- |
| | | 17FMA | 13FA | 17FA | NVP | EDMA | | | |
| Examples | 1 | | | | | 3 | 60 | −50 | 98% or more |
| | 2 | | | | | 3 | 52 | −55 | 98% or more |
| | 3 | | | | | 5 | 52 | −48 | 98% or more |
| | 4 | | | | | 3 | 42 | −40 | 98% or more |
| | 5 | | 35 | | | 2 | 60 | −34 | 98% or more |
| | 6 | | | 35 | | 3 | 65 | −37 | 98% or more |
| | 7 | | | | 5 | 1 | 60 | −50 | 98% or more |
| | 8 | 47 | | | | 3 | 62 | −57 | 98% or more |
| | 9 | | | | | 5 | 48 | −33 | 98% or more |
| | 10 | | 37 | | | 3 | 60 | −36 | 98% or more |
| | 11 | | | 33 | | 3 | 65 | −29 | 98% or more |
| | 12 | 47 | | | | 3 | 67 | −57 | 98% or more |
| | 13 | | | 27 | 10 | 1 | 47 | −30 | 98% or more |
| Comparative | 1 | | | | | 3 | 18 | −37 | 98% or more |
| Examples | 2 | | | | | 5 | 48 | −10 | 98% or more |
| | 3 | | 62 | 27 | 10 | 1 | 50 | −20 | Cloudy |

*1 The amount of each monomer is shown in % by weight.
*2 x10$^{-11}$ [cm$^3$(STP) cm/cm$^2$.sec. mmHg]
*3 [°C.]

As described above, the contact lens of the present invention has excellent oxygen permeability, good flexibility and excellent transparency. Further, the contact lens of the present invention has no water absorbability; therefore, it allows no deposition of lacrima components, etc., is sanitary, requires no boiling sterilization by water, and is convenient to use.

The contact lens of the present invention has good transparency even when it is obtained by copolymerization with a hydrophilic monomer, and this is a characteristic which is unobtainable with the contact lenses of the prior art.

The above superior properties of the present contact lens can be achieved only by using a novel fluorine-containing monomer as an essential component of the polywherein $R_1$ and $R_2$ are independently H or $CH_3$ and may be the same or different, l is an integer of 1-5, m is an integer of 1-2, n is an integer of 4-10, p is an integer of 8 or more, q is an integer of 0 or more, and $p+q=2n+1$.

2. A contact lens having no water absorbability according to claim 1, consisting of a polymer comprising, as an essential component, at least one monomer selected from the group consisting of:

(a) fluorine-containing monomers of the general formula (I) in which $R_2$ is H and accordingly which have an oxyethylene group and are represented by the general formula

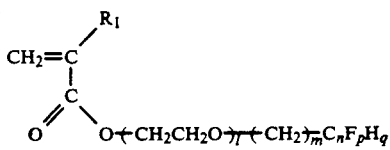 (Ia)

wherein $R_1$, $l$, $m$, $n$, $p$ and $q$ have the same definitions as in the general formula (I), (b) fluorine-containing monomers of the general formula (I) in which $R_2$ is $CH_3$ and accordingly which have an oxypropylene group and are represented by the general formula

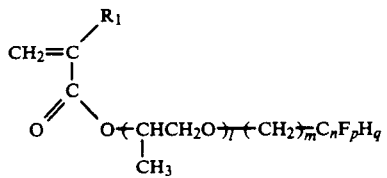 (Ib)

wherein $R_1$, $l$, $m$, $n$, $p$ and $q$ have the same definitions as in the general formula (I), and fluorine-containing monomers of the general formula (I) in which $R_2$ is both of H and $CH_3$ and accordingly which have an oxyethylene-oxypropylene group and are represented by the general formula

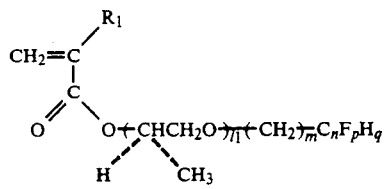 (Ic)

wherein $R_1$, $m$, $n$, $p$ and $q$ have the same definitions as in the general formula (I) and $l_1$ is an integer of 2–5.

3. A contact lens having no water absorbability according to claim 2, wherein the

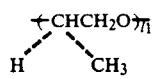

in the general formula (Ic) is a divalent group selected from the group consisting of:

(i) an oxyethylene-oxypropylene group consisting of
(a) one oxyethylene group or 2–4 oxyethylene groups in block, bonded to the formula

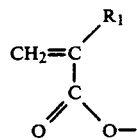

and (b) one oxypropylene group or 2–4 oxypropylene groups in block, bonded to the formula —$(CH_2)_m$—$C_n F_p H_q$, wherein the total number of the group(s) (a) and the group(s) (b) is 2–5, (ii) an oxyethylene-oxypropylene group consisting of (a) one oxypropylene group or 2–4 oxypropylene groups in block, bonded to the formula

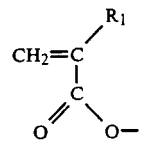

and (b) one oxyethylene group or 2–4 oxyethylene groups in block, bonded to the formula —$(CH_2)_m$—$C_n F_p H_q$, wherein the total number of the group(s) (a) and the group(s) (b) is 2–5, and (iii) an oxyethylene-oxypropylene group existing between the formula

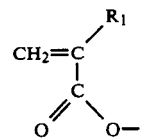

and the formula —$(CH_2)_m$—$C_n F_p H_q$, and consisting of at least one oxyethylene group and at least one oxypropylene group randomly arranged in their total group number of 3–5.

4. A contact lens having no water absorbability according to claim 2, consisting of a homopolymer of a monomer selected from the monomer group (a), (b) or (c).

5. A contact lens having no water absorbability according to claim 2, consisting of a copolymer of two or more monomers selected from the same monomer group (a), (b) or (c).

6. A contact lens having no water absorbability according to claim 2, consisting of a copolymer of two or more monomers selected from at least two different groups of the groups (a), (b) and (c).

7. A contact lens having no water absorbability according to claim 1, wherein at least one monomer represented by the general formula (I) is contained in an amount of 40% by weight or more.

8. A contact lens having no water absorbability according to claim 1, wherein the polymer further comprises at least one monomer represented by the general formula

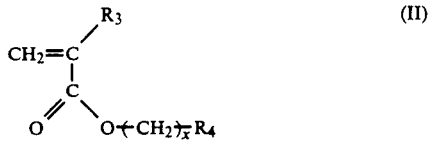 (II)

wherein $R_3$ is H or $CH_3$, $R_4$ is a straight chain fluoroalkyl group having 4–10 carbon atoms and 9–21 fluorine atoms or a straight chain alkyl group of 2–10 carbon atoms, and X is an integer of 1 or 2.

9. A contact lens having no water absorbability according to claim 1, wherein the polymer further comprises at least one hydrophilic monomer selected from the group consisting of 2-hydroxyethyl methacrylate, N-vinylpyrrolidone, acrylamide, acrylic acid, methacrylic acid, N,N-dimethylacrylamide and 2-hydroxyethyl acrylate.

10. A contact lens having no water absorbability according to claim 1, wherein the polymer comprises at least one crosslinking monomer selected from the group consisting of ethylene glycol di(meth)acrylate, diethylene glycol di(meth)acrylate, triethylene glycol di(meth-)acrylate, allyl (meth)acrylate, glycerol di(meth)acrylate, trimethylolpropane tri(meth)acrylate, triallyl isocyanurate, 1,4-butanediol di(meth)acrylate and divinylbenzene.

11. A contact lens having no water absorbability according to claim 1, consisting essentially of a (co)polymer obtained by (co)polymerizing a monomer mixture comprising, as an essential component, at least one fluorine-containing monomer represented by the general formula (I) and, as an optical component, at least one other monomer.

12. A contact lens having no water absorbability according to claim 1, wherein the amount of monomer of the general formula (I) is 50%–97% by weight.

13. A contact lens having no water absorbability according to claim 8, consisting essentially of a copolymer comprising 50%–097% by weight of at least one fluorine-containing monomer represented by the general formula (I) and 27%–47% by weight of at least one monomer represented by the general formula (II).

14. A contact lens having no water absorbability according to claim 10, consisting essentially of a copolymer comprising 50%-97% by weight of at least one fluorine-containing monomer represented by the general formula (I) and 1%–5% by weight of at least one cross-linking monomer.

15. A contact lens having no water absorbability according to claim 8 or 10, consisting essentially of a copolymer comprising 50%–97% by weight of at least one fluorine-containing monomer represented by the general formula (I), 27%–47% by weight of at least one monomer represented by the general formula (II) and 1%–5% by weight of at least one cross-linking monomer.

* * * * *